(12) United States Patent
Fujibayashi

(10) Patent No.: US 7,725,676 B2
(45) Date of Patent: *May 25, 2010

(54) METHOD AND APPARATUS FOR INCREASING AN AMOUNT OF MEMORY ON DEMAND WHEN MONITORING REMOTE MIRRORING PERFORMANCE

(75) Inventor: Akira Fujibayashi, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/463,779

(22) Filed: May 11, 2009

(65) Prior Publication Data

US 2009/0216978 A1    Aug. 27, 2009

Related U.S. Application Data

(63) Continuation of application No. 11/882,911, filed on Aug. 7, 2007, now Pat. No. 7,555,622, which is a continuation of application No. 11/545,562, filed on Oct. 11, 2006, now Pat. No. 7,278,007, which is a continuation of application No. 11/360,470, filed on Feb. 24, 2006, now Pat. No. 7,136,983, which is a continuation of application No. 10/784,260, filed on Feb. 24, 2004, now Pat. No. 7,039,785.

(51) Int. Cl.
    *G06F 12/00* (2006.01)
(52) U.S. Cl. ..................................... 711/170
(58) Field of Classification Search ............ None
    See application file for complete search history.

(56) References Cited

U.S. PATENT DOCUMENTS 5,170,480 A    12/1992    Mohan et al.
5,403,639 A    4/1995     Belsan et al.
5,426,736 A    6/1995     Guineau, III (Continued)

FOREIGN PATENT DOCUMENTS

JP    11-085408    3/1999

(Continued)

OTHER PUBLICATIONS

"SANRAD Application Note: Data Migration Solution Transferring Data Between Storage Systems over Fibre-channel or SCSI connections", APP-003-03, SANRAD, 2003, pp. 1-9.

*Primary Examiner*—Hiep T Nguyen
(74) *Attorney, Agent, or Firm*—Mattingly & Malur, P.C.

(57)    ABSTRACT

A method and storage system for increasing an amount of memory in a queuing area on. The storage system includes first and second storage subsystems connected to each other via a path. A primary volume in the first storage subsystem and a remote secondary volume in the second storage subsystem are mirrored and operated in the asynchronous mode. A queuing area having memory is provided in the second storage subsystem for temporarily storing data transferred to the second storage subsystem from the first storage subsystem in response to a write input/output (I/O) issued by a host to write data in the primary volume. Data temporarily stored in the memory is retrieved and stored in the remote secondary volume. An unused area of the queuing area is monitored and the memory increased if the unused area becomes less than a predetermined amount.

13 Claims, 5 Drawing Sheets

Monitoring Result Table

| Device ID | Device | Conf. | Cap. | Current Usage |
|---|---|---|---|---|
| 1 | Cache | 70 % | 32GB | 30% |
| 2 | disk | 8 | 120GB | 60% |

U.S. PATENT DOCUMENTS

| | | |
|---|---|---|
| 6,209,002 B1 | 3/2001 | Gagne et al. |
| 6,289,416 B1 | 9/2001 | Fukushima et al. |
| 6,295,582 B1 | 9/2001 | Spencer |
| 6,324,654 B1 | 11/2001 | Wahl et al. |
| 6,385,673 B1 | 5/2002 | DeMoney |
| 6,401,147 B1 | 6/2002 | Sang et al. |
| 6,442,661 B1 | 8/2002 | Dreszer |
| 6,457,105 B1 | 9/2002 | Spencer et al. |
| 6,779,058 B2 | 8/2004 | Kishi et al. |
| 7,039,785 B2 * | 5/2006 | Fujibayashi ................. 711/170 |
| 7,136,983 B2 * | 11/2006 | Fujibayashi ................. 711/170 |
| 7,278,007 B2 * | 10/2007 | Fujibayashi ................. 711/170 |
| 7,555,622 B2 * | 6/2009 | Fujibayashi ................. 711/162 |
| 2004/0024794 A1 | 2/2004 | Jain et al. |
| 2004/0267829 A1 | 12/2004 | Hirakawa et al. |
| 2005/0071393 A1 | 3/2005 | Ohno et al. |

FOREIGN PATENT DOCUMENTS

| | | |
|---|---|---|
| JP | 2002149492 | 5/2002 |
| JP | 2004-013367 | 1/2004 |
| WO | 0231660 | 4/2002 |

* cited by examiner

FIG. 2: Disk Management Table

| Device No. | Installation Status | Lic Key Stat | Size |
|---|---|---|---|
| 1 | Installed | Installed | 500 GB |
| 2 | Installed | installed | 500 GB |
| 3 | Installed | No | 250 GB |
| 4 | Installed | No | 250 GB |
| 5 | no | N/A | N/A |
| ... | | | |
| n | no | N/A | N/A |

Fig 3: Cache Management Table

| Slot No. | Installation Status | Lic KeyStat | Size |
|---|---|---|---|
| 1 | Installed | install | 2GB |
| 2 | Installed | no | 2GB |
| 3 | no | N/A | N/A |
| ... | | | |
| m | no | N/A | N/A |

Fig 4: Monitoring Result Table

| Device ID | Device | Conf. | Cap. | Current Usage |
|---|---|---|---|---|
| 1 | Cache | 70 % | 32GB | 30% |
| 2 | disk | 8 | 120GB | 60% |

METHOD AND APPARATUS FOR INCREASING AN AMOUNT OF MEMORY ON DEMAND WHEN MONITORING REMOTE MIRRORING PERFORMANCE

CROSS-REFERENCES

This is a continuation application of U.S. Ser. No. 11/882,911, filed Aug. 7, 2007, which is a continuation application of U.S. Ser. No. 11/545,562, filed Oct. 11, 2006, (now U.S. Pat. No. 7,278,007), which is a continuation application of U.S. Ser. No. 11/360,470, filed Feb. 24, 2006, (now U.S. Pat. No. 7,136,983), which is a continuation application of U.S. Ser. No. 10/784,260, filed Feb. 24, 2004 (now U.S. Pat. No. 7,039,785). The entire disclosures of all of the above-identified applications are hereby incorporated by reference.

BACKGROUND OF THE INVENTION

The present invention relates generally to techniques for implementing the remote mirroring function. More particularly the present invention relates to a method and apparatus for increasing an amount of memory on demand in a storage system implementing the remote mirroring function when the mirrored pair of volumes of the storage system is operated in the asynchronous mode.

Conventionally, there have been two types of approaches to storage-based volume replication, namely local replication and remote (copy) replication. Both technologies mirror files, file systems, or volumes without using host CPU power. When a host conducts a host input/output (I/O) such as a write I/O of data to a primary volume (PV) of a storage system, the storage system automatically copies the data to a replication (secondary) volume (SV). This mechanism ensures that PV and SV are identical.

Local replication duplicates the primary volume within a first storage system, so that when the host writes data to the PV, the first storage system also stores the data to a local secondary volume (LSV). Local replication is typically used for taking backups.

Remote replication duplicates volumes across two or more storage the data through paths, such as ESCON, Fibre Channel, T3, and/or IP networks, to at least one second storage system for storage in a remote secondary volume (RSV) included therein. Remote replication is typically used to enable the recovery of data from disasters, such as earthquake, flood, fire, and the like. Even if the first storage system or the whole data center at the primary site is damaged by a disaster, data is unaffected at the secondary site and business can be resumed quickly.

There are at least two modes of transferring data to implement remote mirroring between local and remote storage systems, namely synchronous mode and asynchronous mode. In the synchronous mode, all write I/O's to the PV of the first storage system are mirrored at the RSV of the second storage system. In the asynchronous mode, in response to a write I/O, the first storage system completes the write I/O and then asynchronously transfers the write data to the second storage system for storage on the RSV. Specifically, the write data to be copied to the RSV of the second storage system is temporarily stored in a queuing area, such as cache memory, disk storage, Non-Volatile Random Access Memory (NVRAM) etc. The write data is retrieved from the queuing area and then stored in the RSV of the second storage system.

The queuing area where the write data is temporarily stored may run out if the write I/O rate (write I/O's per second) to the primary volume of the first (local) storage system is much higher than the throughput for copying the write data from the queuing area to the remote secondary volume of the second (remote) storage system. Once the unused area of the queuing area becomes less than a certain percentage of total area of the queuing area, the storage system mirroring function will initiate a throttling function to curb the new write I/O's. Thus, the performance of the storage system with respect to write I/O's degrade over time.

A current proposed solution is that if a customer experiences a degradation in performance with respect to write I/O's, then the customer calls a customer support center which analyzes the cause of the problem and may increase the capacity of the queuing area if necessary. The total turn around time for this proposed solution if long can negatively affect customer satisfaction. This negative affect on customer satisfaction is more likely to occur since the turn around time is influenced by many human interactions that are necessary.

SUMMARY OF THE INVENTION

The present invention provides a method and apparatus for increasing an amount of memory on demand in a storage system implementing the remote mirroring function when the mirrored pair of volumes of the storage system is operated in the asynchronous mode.

According to the present invention a method and storage system is provided for increasing an amount of memory on demand in the storage system implementing a remote mirroring function. The storage system includes first and second storage subsystems which are connected to each other via a path and the first storage subsystem is connected to a host. A primary volume is provided to the first storage subsystem and a remote secondary volume is provided to the second storage subsystem. The remote secondary volume is a copied volume of the primary volume and the primary volume and the remote secondary volume are operated in the asynchronous mode. A memory is provided in the second storage subsystem for temporarily storing data transferred to the second storage subsystem from the first storage subsystem in response to a write input/output (I/O) issued by the host to write data in the primary volume. Data temporarily stored in the memory is retrieved and stored in the remote secondary volume. An unused area of the memory is monitored and the amount of the memory is increased if the unused area becomes less than a predetermined amount.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto, wherein in the following brief description of the drawings:

FIG. 2 illustrates an example of a disk management table for managing disk drives to implement the present invention;

FIG. 3 illustrates an example of a cache management table for managing cache memory to implement the present invention;

FIG. 4 illustrates an example of a monitoring result table for storing the results of monitoring the resources of a storage system according to the present invention;

DETAILED DESCRIPTION OF THE INVENTION

Figure 1:
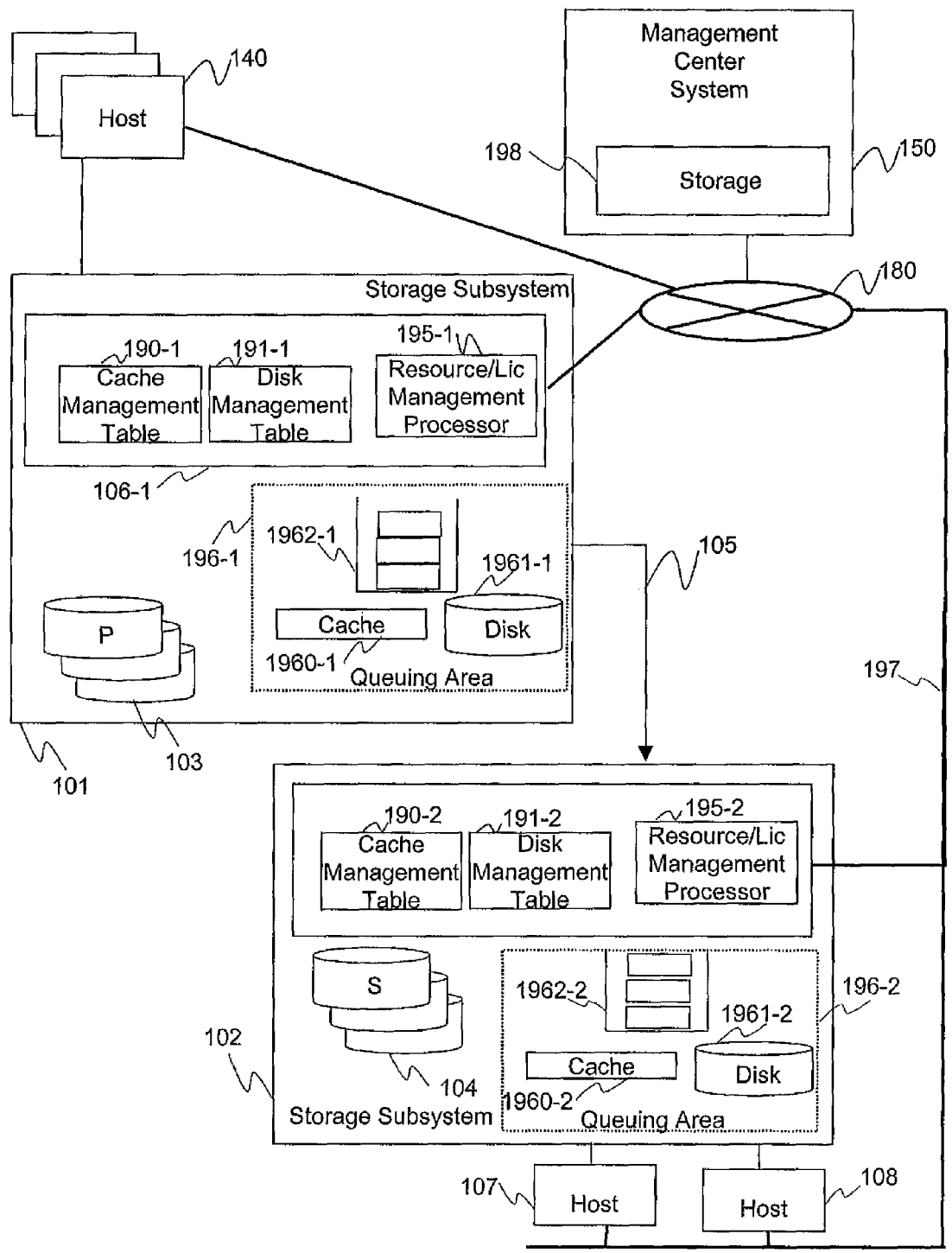
FIG. 1 illustrates the configuration of a system for increasing an amount of memory on demand in a storage system according to the present invention.

As per FIG. 1, the present invention provides a storage system which includes a first storage subsystem 101 and a second storage subsystem 102 that are connected to each other by a path 105 and implements a remote mirroring function. The method and storage system of the present invention as provided increases an amount of memory on demand in the storage system as needed depending on the state of a queuing area.

As per FIG. 1, the first storage subsystem 101 includes a primary volume (P) 103, a storage controller 106-1 which includes a cache management table 190-1, a disk management table 191-1 and a resource/license manager 195-1, and a queuing area 196-1. The first storage subsystem 101 is connected to a host 140 and to a network 180.

Further, as per FIG. 1, the second storage subsystem 102 includes a remote secondary volume (S) 104, a storage controller 106-2 which includes a cache management table 190-2, a disk management table 191-2 and a resource/license manager 195-2, and a queuing area 196-2. The remote secondary volume (S) 104 is a copied volume of the primary volume (P) 103 and the primary volume (P) 103 and the remote secondary volume (S) 104 are operated in the asynchronous mode. The second storage subsystem 102 is connected to hosts 107 and 108. The second storage subsystem 102 and the hosts 107 and 108 are connected to the network 180 via a local area network (LAN) 197.

As illustrated in FIG. 1, the queuing area 196-1 and 196-2 of each storage subsystem 101 and 102 can for example be cache memory 1960-1, 1960-2, disk drives 1961-1, 1961-2, or memory devices 1962-1, 1962-2. Any of these devices would be acceptable and of course such devices could, for example, be pre-installed and configured so as to permit expansion of its storage capacity.

According to FIG. 1 a management center system 150 is provided for managing the storage resources of the storage system and various licensing matters with respect to the storage system including various licensing keys as will be described below. The management center system 150 is connected to the network 180 and thereby to the first storage subsystem 101 and the host 140 via the network 180 and to the second storage subsystem 102 and the hosts 107 and 108 via the network 180 and the LAN 197. The management center system 150 includes a storage 198 which serves as a repository of information collected from the resource/license managers 195-1 and 195-2, each of which manages the resources of its respective storage subsystem 101, 102 based on the cache management table 190 and the disk management table 191.

FIG. 2 illustrates an example of a disk management table 191 for managing disk drives to implement the present invention. The disk management table 191 includes a plurality of entries, wherein each entry includes at least a device number field 201, an installation status field 202, a license key status field 203 and a size field 204. Thus, as per FIG. 27 for example, a first entry of the disk management table 191 indicates in the device number field 201 a disk drive 1, in the installation status field 202 that disk drive 1 is installed, in the license key status field 203 that the license key for disk drive 1 is installed, and in the size field 204 that the size of disk drive 1 is 500 Giga bytes. Another entry of disk management table 191, for example the third entry, is similar to the first entry with the exception that the third entry concerns disk drive 3, that the license key for disk drive 3 is not installed and that the size of the disk drive 3 is 250 Giga bytes. Yet another entry of disk management table 191, for example the fifth entry, is different from the other entries in that the fifth entry concerns disk drive 5 and that disk drive 5 is not installed. According to the present invention a license key must be installed in order to use a corresponding disk drive and of course a disk drive can not be used if it has not been installed.

Thus, according to the present invention disk management table 191 indicates whether or not a disk drive has been installed, whether or not a license key for the disk drive has been installed and the size of the disk drive if installed. Therefore, the disk management table 191 tracks information regarding the status of respective disk drives, thereby permitting decisions to be made so as to properly manage the resources of the storage system particularly with regard to the queuing area 196.

FIG. 3 illustrates an example of a cache management table 190 for managing cache memory to implement the present invention. As per FIG. 3, the cache management table 190 includes a plurality of entries, wherein each entry includes at least a slot number field 301, an installation status field 302, a license key status field 303 and a size field 304. Thus, as per FIG. 3, for example, a first entry of the cache management table 190 indicates in the slot number field 301 a memory device 1, in the installation status field 302 that memory device 1 is installed, in the license key status field 303 that the license key for memory device 1 is installed, and in the size field 304 that the size of memory device 1 is 2 Giga bytes. Another entry of cache management table 190, for example the second entry, is similar to the first entry with the exception that the second entry concerns memory device 2, that the license key for memory device 2 is not installed and that the size of the memory device 2 is 2 Giga bytes. Yet another entry of cache management table 190, for example the third entry, is different from the other entries in that the third entry concerns memory device 3 and that memory device 3 is not installed. According to the present invention a license key must be installed in order to use a corresponding memory device and of course a memory device can not be used if it has not been installed.

Thus, according to the present invention cache management table 190 indicates whether or not a memory device has been installed, whether or not a license key for the memory device has been installed and the size of the memory device if installed. Therefore, the cache management table 190 tracks information regarding the status of respective memory devices, thereby permitting decisions to be made so as to properly manage the resources of the storage system particularly with regard to the queuing area 196.

FIG. 4 illustrates an example of a monitoring results table 400 for storing the results of monitoring the resources of a storage system particularly with regard to the queuing area 196 according to the present invention. The monitoring results table 400, for example, is stored in either the storage 198 of the management center system 150 or in the resource/license manager 195 included in each of the storage subsystems 101 and 102. The monitoring results table 400 includes a plurality of entries wherein each entry includes a device identification (ID) field 401 for identifying a device number of a device being used in the queuing area 196, a device field 402 which identifies the type of device either a cache or disk drive being used in the queuing area 196, a configuration field 403 for indicating an amount of the total capacity of the queuing area the device represents according to the particular configuration, a capacity field 404 which indicates the capacity of the device and a current usage field 405 for indicating the amount of the capacity of the device being used.

Thus, for example, as illustrated in FIG. 4, the first entry of the monitoring results table 400 in the device ID field 401 identifies device 1, in the device field 402 identifies device 1 as a cache, in configuration field 403 indicates that the cache of device 1 represent 70% of the total capacity available, in the capacity field 404 indicates device 1 has a capacity of 32 Giga bytes, and in the current usage field indicates the current usage of the cache amounts to 30% of the available capacity.

As per the present invention, the management center system 150 or the resource/license manager 195 makes use of the information stored in the monitoring results table 400 so as to determine whether an action should be taken or not. Also, the monitoring results table 400 can be used to permit historical analysis of the usage made of the devices forming the queuing area 196 so as to determine whether a particular trend is exhibited to which a counter process or procedure can be implemented.

Figure 5:
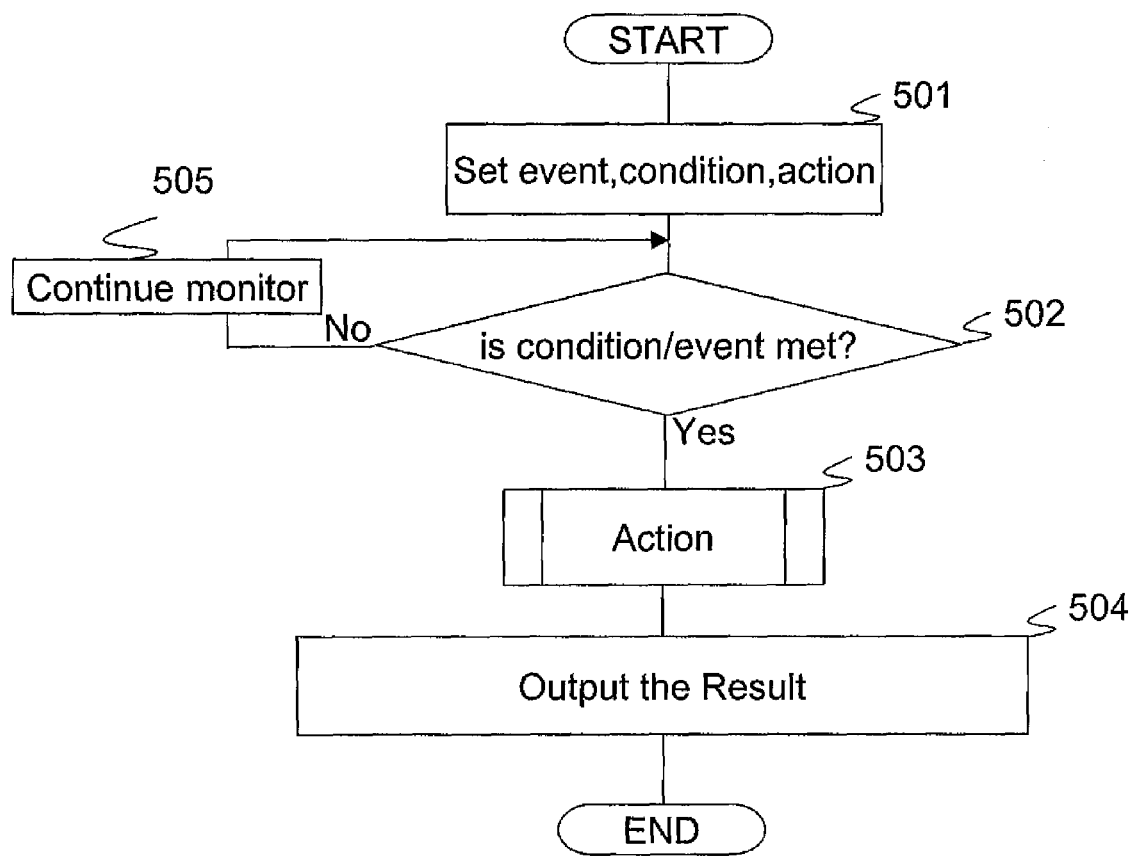
FIG. 5 is a flowchart illustrating an example of a process for increasing an amount of memory on demand in a storage system according to the present invention.

FIG. 5 illustrates a flowchart of an example of a process executed by either the management center system 150 or the storage subsystems 101 or 102. It should be further noted that each of the steps illustrated in the flowchart of FIG. 5 can, for example, be implemented by one or more instructions of a computer program stored in a storage medium such as the hard drive of a computer system, a floppy disk, CD ROM, electrically erasable programmable read only memory (EE-PROM), etc.

Figure 6:
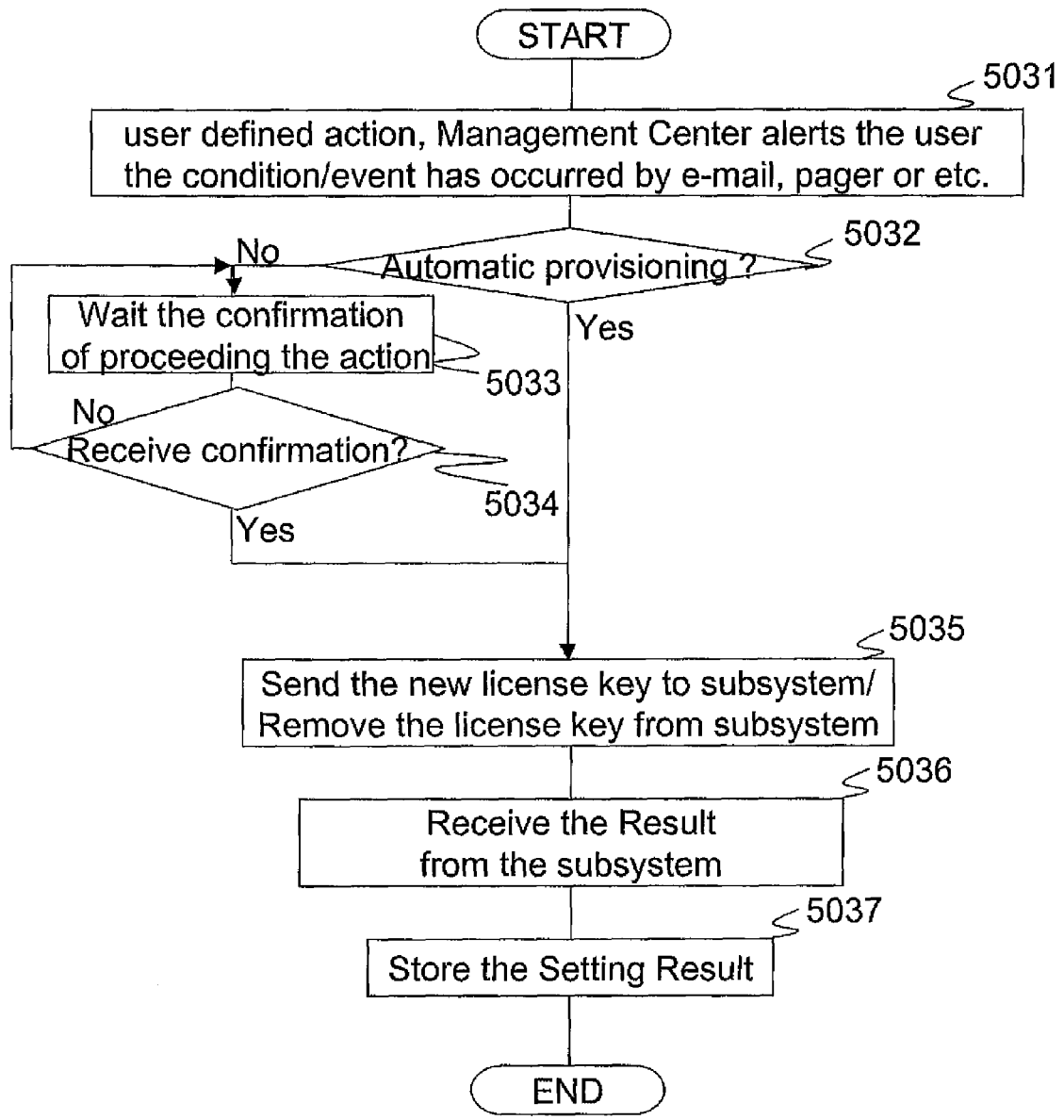
FIG. 6 is a flowchart illustrating an example of the details of processing performed to implement Step 503 of FIG. 5 according to the present invention.

As per FIG. 5, the process starts with the user defining, setting the event or condition to be detected and the specific action to be performed when the event or condition has been detected (step 501). The event or condition to be detected could, for example, include detecting when the current usage of the queuing area 196 exceeds a predetermined limit. This limit could be set at any level (60%, 80%, etc.) so long as it is appropriate to ensure efficient operation of the storage system. Information regarding the set event or condition is periodically checked (monitored) so as to detect whether the event or condition has occurred (step 502). The information to be checked could, for example, include the entries in the monitoring results table 400. If the event or condition has not occurred then the system continues monitoring the information (step 505). If the event or condition has occurred then the action set by the user corresponding to the event or condition is performed (step 503). The details of step 503 are illustrated in FIG. 6 and will be discussed below. After the preset action has been performed a result of the action is output, for example, in the form of a notice or charge (step 504).

As per the above, FIG. 6 illustrates a flowchart of an example of the details of processing performed to implement step 503 of FIG. 5. As per FIG. 6 in the action of step 503 the preset user defined action including, for example, the management center alerting the user that the preset event or condition has occurred by email, pager, etc., is performed (step 5031). Thereafter, it is determined whether the additional capacity (memory) needed by the queuing area 196 is to be automatically provisioned or not (step 5032). If the additional memory is not to be automatically provisioned then the system waits for a confirmation as to whether the user defined action is to be conducted or not (steps 5033 and 5034). This confirmation could, for example, be provided by the management center system 150 or the user of the storage system being monitored. If the confirmation has not been received then step 5033 is conducted again. If the confirmation has been received then a new license key is sent to the storage subsystem requiring an increase in capacity of its queuing area 196 or the license key is removed from the storage subsystem (step 5035). Information indicating a result of the action taken, for example, installing a disk drive to the queuing area is sent to either the resource/license manager 195 or the management center system 150 (step 5036). Thereafter, the information indicating the result sent to either the resource/license manager 195 of the management center system 150 is stored in the monitoring result table 400 (step 5037).

It should be noted that step 503 of FIG. 5, the details of which are illustrated in FIG. 6 could, for example, be performed by the management center system 150 while steps 501, 502, 504 and 505 could, for example, be performed in either the management center system 150 or a storage subsystem 101 or 102. Further, it should be noted that the storage 198 could, for example, also serve as a repository of collected information including, for example, customer definition regarding features of the customer's storage subsystems and location information regarding the location of the customer's storage subsystems. This information is consulted as needed by the management center system 150 when automatic provisioning is not performed. In such a situation, a service person receives such information from the management center system by email, pager or the like and uses such information to service the customer's storage subsystem at the customer's location upon detecting or being given notice that an unused area of the queuing area is less than a predetermined level.

Therefore, based on the above, the present invention provides a method and apparatus for increasing an amount of memory on demand in a storage system implementing a remote mirroring function. According to the present invention, the storage system includes first and second storage subsystems which are connected to each other via a path wherein the first storage subsystem is connected to a host. As per the present invention, a primary volume is provided to the first storage subsystem and remote secondary volume is provided to the second storage subsystem, the remote secondary volume being a copied volume of the primary volume which is operated in a synchronous mode with respect to the remote the secondary volume. As per the present invention, a memory such as cache memory, disk drives, memory devices or the like are provided in the second storage subsystem for temporarily storing data transferred to the second storage subsystem from the first storage subsystem in response to a write I/O issued by the host to write data in the primary volume. Data temporarily stored in the memory is retrieved and stored in the remote secondary volume. However, unique according to the present invention is that an unused area of the memory is monitored and the amount of the memory is increased if the unused area becomes less than a predetermined amount. Thus, the present invention provides for quick and efficient provisioning of additional memory in the queuing area of a storage system on demand.

While the invention has been described in terms of its preferred embodiments, it should be understood that numerous modifications may be made thereto without departing from the spirit and scope of the present invention. It is intended that all such modifications fall within the scope of the appended claims.

What is claimed:

1. A method for controlling a system including first and second storage systems, the first storage system receiving input/output (I/O) requests from a host, and the first and second storage systems being coupled to a management system:
   providing a primary volume to the first storage system and a remote secondary volume to the second storage subsystem, the remote secondary volume being a copied volume of the primary volume, the primary volume and the remote secondary volume being mirrored asynchronously;
   providing a first storage in a queuing area of the first storage system and a second storage in a queuing area of the second storage system for storing data transferred from the first storage system to the second storage system in response to a write I/O request issued by the host to write data in the primary volume;
   retrieving data stored in the second storage and storing the data in the remote secondary volume;
   monitoring the queuing area of the first or second storage system; and
   sending an alert to the management system if an unused area of the queuing area of the first or second storage system is less than a predetermined amount.

2. The method according to claim 1,
   automatically provisioning additional capacity to the first or second storage if the unused area of the queuing area of the first or second storage system is less than a predetermined amount.

3. The method according to claim 1,
   provisioning additional capacity to the first or second storage in response to a user action after the sending of the alert.

4. The method according to claim 1,
   wherein the predetermined amount is set by a user via the management system.

5. The method according to claim 1,
   the first and second storage include disk drives.

6. The method according to claim 1,
   the first and second storage include cache memories.

7. A method for controlling a system including first and second storage systems, the first storage system receiving input/output (I/O) requests from a host:
   providing a primary volume to the first storage system and a remote secondary volume to the second storage subsystem, the remote secondary volume being a copied volume of the primary volume, the primary volume and the remote secondary volume being mirrored asynchronously;
   providing a first storage in a queuing area of the first storage system and a second storage in a queuing area of the second storage system for storing data transferred from the first storage system to the second storage system in response to a write I/O request issued by the host to write data in the primary volume;
   retrieving data stored in the second storage and storing the data in the remote secondary volume; and
   monitoring an unused area of the queuing area of the first or second storage systems so as to increase an amount of the first or second storage therein when the unused area becomes less than a predetermined amount.

8. The method according to claim 7,
   sending an alert to a management system coupled to first and second storage systems, if the unused area of the queuing area of the first or second storage system is less than a predetermined amount.

9. The method according to claim 7,
   automatically provisioning additional capacity to the first or second storage if the unused area of the queuing area of the first or second storage system is less than a predetermined amount.

10. The method according to claim 8,
    provisioning additional capacity to the first or second storage in response to a user action after the sending of the alert.

11. The method according to claim 8,
    wherein the predetermined amount is set by a user via the management system.

12. The method according to claim 7,
    wherein the first and second storage include disk drives.

13. The method according to claim 7,
    wherein the first and second storage include cache memories.

* * * * *